Jan. 22, 1924.
C. W. BECK
STEERING WHEEL
Filed Jan. 2, 1923
1,481,530
2 Sheets-Sheet 1
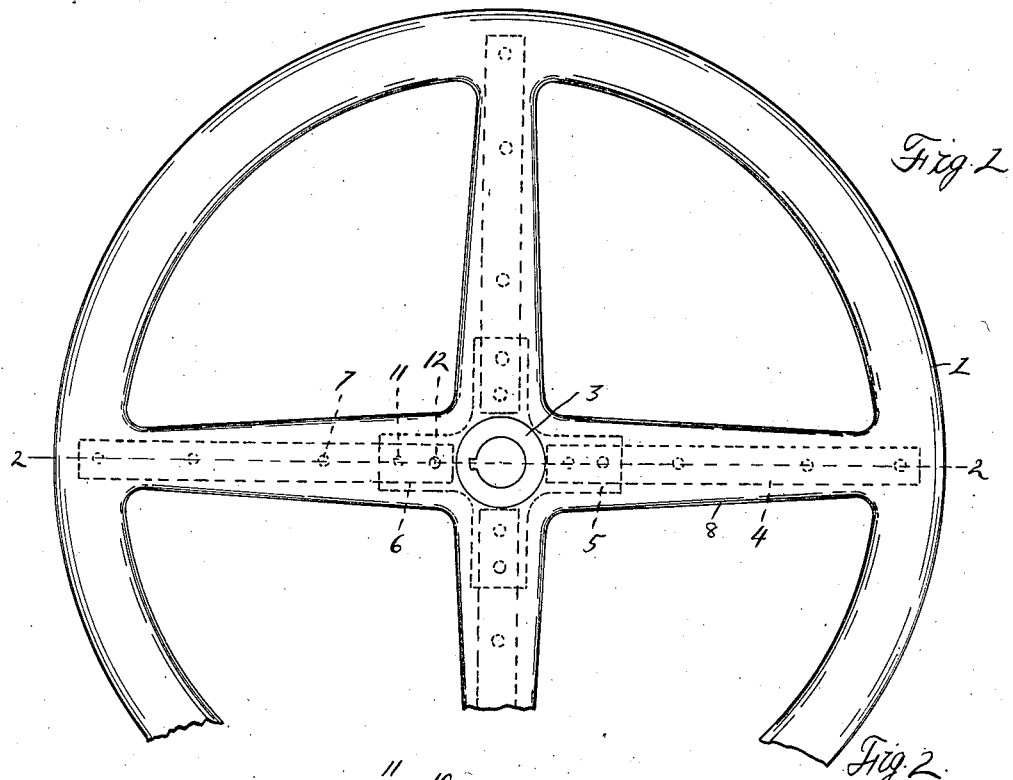
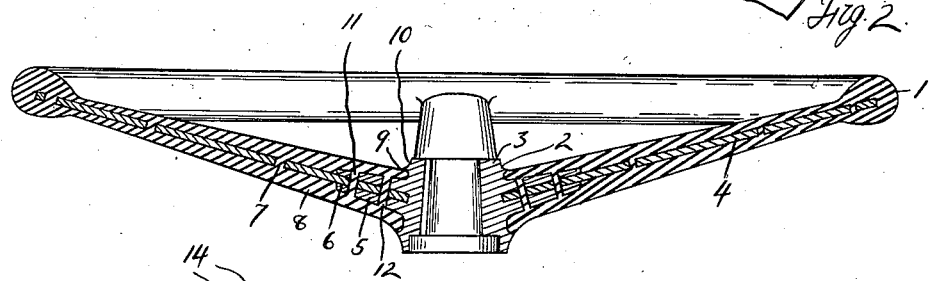
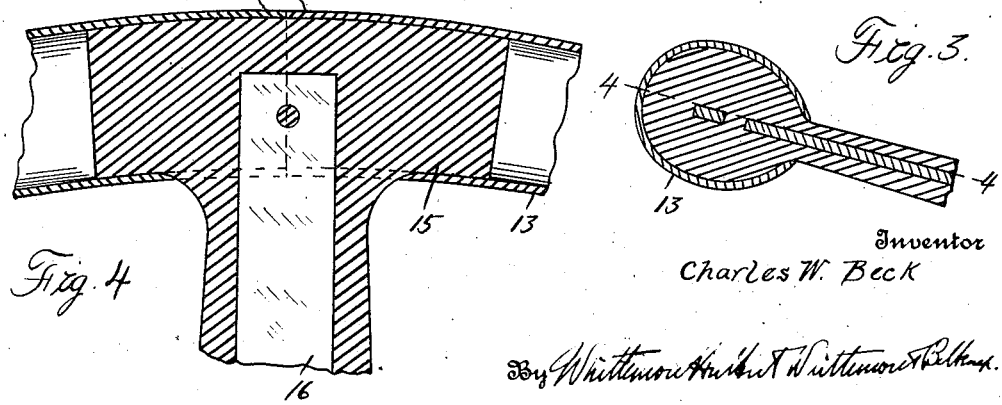
Inventor
Charles W. Beck Jan. 22, 1924.

C. W. BECK

STEERING WHEEL

Filed Jan. 2, 1923

Inventor
Charles W. Beck

Attorneys

Patented Jan. 22, 1924.

1,481,530

UNITED STATES PATENT OFFICE.

CHARLES W. BECK, OF DETROIT, MICHIGAN.

STEERING WHEEL.

Application filed January 2, 1923. Serial No. 610,366.

*To all whom it may concern:*

Be it known that I, CHARLES W. BECK, a citizen of the United States of America, residing at Detroit, in the county of Wayne and State of Michigan, have invented certain new and useful Improvements in Steering Wheels, of which the following is a specification, reference being had therein to the accompanying drawings.

This invention relates to wheels and refers more particularly to the manufacture of steering wheels designed for use on motor vehicles.

An object of the invention is to provide a construction in which the hands of the operator will not come in contact with any metallic surface, this being particularly desirable when driving in cold weather.

Another object is to provide a strong and durable wheel of the built-up type which is simple in construction and which may be manufactured at a very low cost.

With the above and other objects in view, the invention consists in certain novel features of construction, combination and arrangement of parts as will be more fully described and particularly pointed out in the appended claims.

In the accompanying drawings:

Figure 1 is a top plan view of a wheel embodying my invention;

Figure 2 is a sectional view taken on line 2—2 of Figure 1;

Figure 3 is a sectional view taken through a slightly modified construction;

Figure 4 is a detail sectional view of a slightly modified construction;

Figure 5:
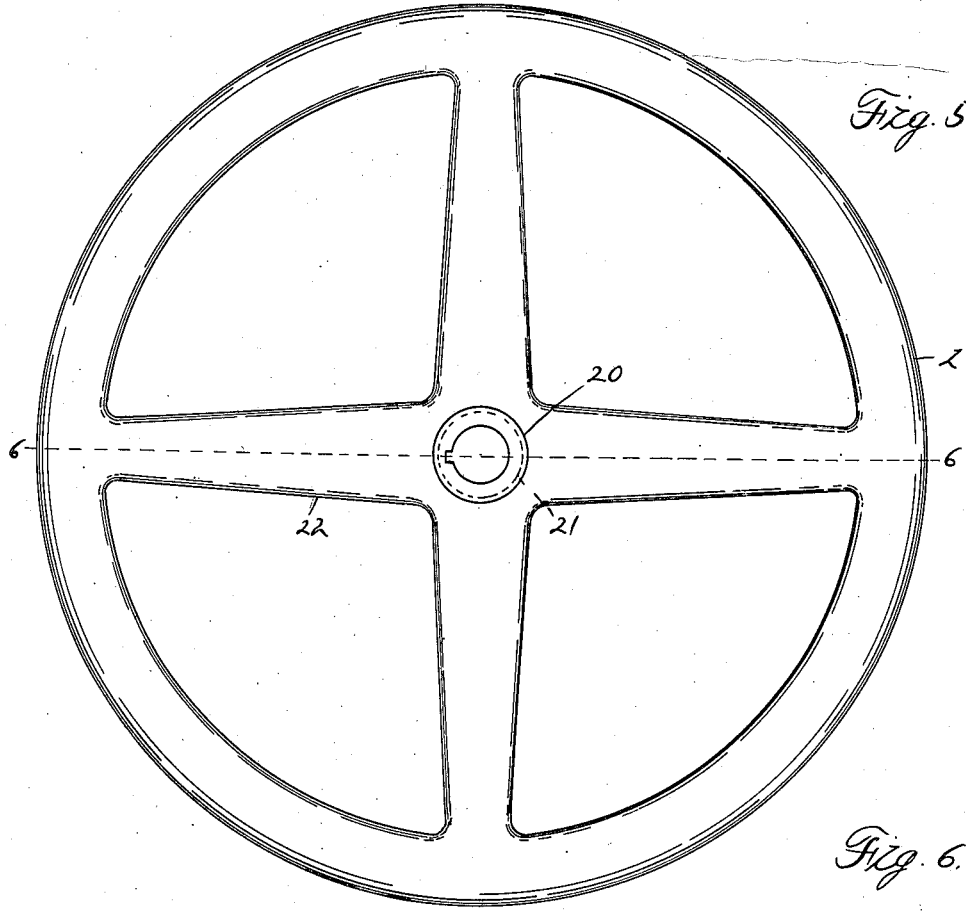
Figure 5 is a top plan view of a slightly modified form of construction.

In the present state of the art it is usual to construct the rims of steering wheels out of wood or metal, and it is also usual to mount the rim upon a metallic spider which connects it with the hub mounted on the steering stem. In steering with the wheel it is difficult to avoid bringing the hands in contact with the spider arms and the chilled surface of metal is uncomfortable. Furthermore, the edges of the spider arms are usually thin and do not form as comfortable bearing for the hand to grasp.

To overcome the objections referred to above, I have provided a comparatively light wheel in which the metallic spider arms are entirely encased in coverings formed from plastic material and support a rim which is also formed from plastic material. The arrangement is such that the outer ends of the coverings merge into the rim and form an easy and comfortable bearing for the hand.

Referring now to the drawing in which like characters of reference designate corresponding parts throughout the several views, the numeral 1 designates a rim supported upon a metallic spider 2 which includes a hub 3 and a plurality of radially extending arms 4. The hub is preferably a die casting and is provided with a plurality of radially extending upwardly inclined projections 5. Each projection is provided with a longitudinally extending socket 6 which is adapted to receive the inner end of an arm 4. The arms are preferably steel stampings and are of sufficient thickness to fit tightly within the sockets 6. Each arm 4 is provided with a series of spaced openings 7 which are adapted to receive the plastic material of the coverings 8 and the rim 1. The coverings 8 for the arms also surround the projections 5 and are flared at their inner ends as shown at 9 so as to register with the lower edge of a beveled portion 10 of the hub.

The rim and coverings are secured to the arms and projections in a single operation by providing a suitable mold or vulcanizing apparatus (not shown) in which the arms and projections are secured and in which the proper amount of plastic material is placed. The mold is subjected to the proper degree of heat and pressure so as to solidify or harden the rim and coverings. During the hardening process the plastic material will be forced through the openings 7 in the arms and will securely bind the rim and arms together, as well as secure a firm engagement between the coverings and arms. The plastic material of the coverings 8 is also forced through openings 11 and 12 in the projections as well as the openings 7 at the inner ends of the arms and will therefore securely bind the arms to the hub.

The rim 1 and coverings 8 may be constructed of any suitable material, but preferably, are formed of a rubber composition in which the base is rubber and the fillers either sulphur, asphaltum, bitumen, cold tar, pitch, lime, litharge or zinc oxide. Any other suitable ingredients may be employed for coloring purposes.

In the modification illustrated in Figure 4, a hollow rim 13 is employed in the construction of the steering wheel. This rim may be formed of any suitable material and may be constructed in any desired manner. As shown the rim 13 is composed of segments 14 which are connected at their meeting ends by means of filler members 15 to which the spider arms 16 are attached.

Figure 6:
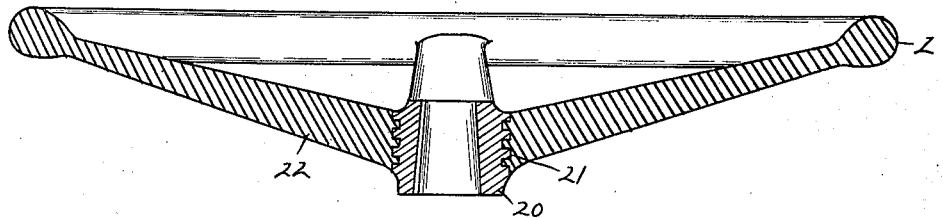
Figure 6 is a sectional view taken on line 6—6 of Figure 4.

In Figures 5 and 6, I have shown a modification of the construction shown in Figures 1 to 3 inclusive and have disclosed a construction in which the arms as well as the rim are formed from a suitable plastic material. A hub 20 preferably provided with a series of spaced annular ribs 21, is employed in the construction of the wheel and is secured to the arms 22, preferably in a single operation, by providing a suitable mold or vulcanizing apparatus (not shown) in which the hub 20 is secured and in which the proper amount of plastic material is placed. The mold is subjected to the proper degree of heat and pressure so as to solidify or harden the arms and rim. During the hardening process the plastic material will be forced around the hub and between the annular ribs 21 and will secure a permanent and rigid connection between the arms and hub.

While it is believed that from the foregoing description the nature and advantages of the invention will be readily apparent, I desire to have it understood that I do not limit myself to what is herein shown and described and that such changes may be resorted to when desired as fall within the scope of what is claimed.

What I claim as my invention is:

1. In a wheel, the combination with a hub, of projections upon said hub, arms secured to said projections, a rim carried by said arms, and coverings molded upon said arms and projections.

2. In a steering wheel, the combination with a hub, of projections upon said hub, said projections having sockets formed therein, arms engaging said sockets, a rim carried by said arms, and coverings molded upon said arms and projections.

3. In a steering wheel, the combination with a hub, of projections upon said hub, arms secured to said projections, said projections and arms having openings therein, a rim cast upon said arms and having portions engaging certain of the openings in said arms, and coverings molded upon said arms and projections and having portions engaging the openings in said projections and certain of the openings in said arms.

4. In a steering wheel, the combination with a hub, projections upon said hub, a plurality of radially extending members engaging said projections, and means for concealing said projections, said means having a part thereof connecting said members to said projections.

5. In a wheel, a hub, projections on said hub, radially extending members engaging the projections, and means formed from plastic material for covering said members and securing the same to said projections.

6. In a wheel, the combination with a hub, of a plurality of arms formed from plastic material, and relatively short projections with respect to said arms on said hub extending into said arms.

7. In a wheel, the combination with a hub, of a plurality of arms, and relatively short projections with respect to said arms on said hub extending into said arms.

8. In a wheel, the combination with a hub and a rim, of a plurality of arms formed from plastic material extending between said hub and rim, and projections on said hub extending into said arms.

9. In a steering wheel, a hub, projections extending radially from said hub, said projections having sockets, arms fitting said sockets, and means formed from plastic material for covering the joints between said arms and projections and securing said arms and projections together.

In testimony whereof I affix my signature.

CHARLES W. BECK.